United States Patent [19]

Gerry

[11] 4,006,493
[45] Feb. 1, 1977

[54] TAPE CASSETTE
[76] Inventor: Martin E. Gerry, 13452 Winthrope St., Santa Ana, Calif. 92705
[22] Filed: May 19, 1975
[21] Appl. No.: 579,004
[52] U.S. Cl. ............................. 360/132; 242/192; 360/93
[51] Int. Cl.² .................. G11B 23/04; G11B 15/30
[58] Field of Search ............... 360/132, 96, 85, 92, 360/93; 242/192, 197–200

[56] References Cited
UNITED STATES PATENTS

| | | | |
|---|---|---|---|
| 2,441,679 | 5/1948 | Wade | 360/132 |
| 3,497,157 | 2/1970 | Hanes et al. | 242/192 |
| 3,650,495 | 3/1972 | Boyer | 242/192 |
| 3,667,701 | 6/1972 | Blum | 242/192 |
| 3,685,171 | 8/1972 | Kosaka | 360/132 |
| 3,752,113 | 8/1973 | Blechman | 360/132 |
| 3,892,727 | 6/1975 | Carvajal | 360/132 |

Primary Examiner—Alfred H. Eddleman

[57] ABSTRACT

A cassette having a pair of disks oppositely disposed at the respective outer faces of the cassette, provides ability to drive the disks at their edges and hence translate tape in the cassette linearly. These disks are recessed below tabs provided at the outer faces of the cassette. The cassette reels therefore do not have to be driven at their centers and hence recording equipment in which they are used, is not required to have projecting drive shafts that interfere with insertion of the cassette into such equipment. With this new cassette, automatic sequential loading of a series of cassette units is possible, by mere translation of the cassette units in a conveyor type arrangement.

12 Claims, 4 Drawing Figures

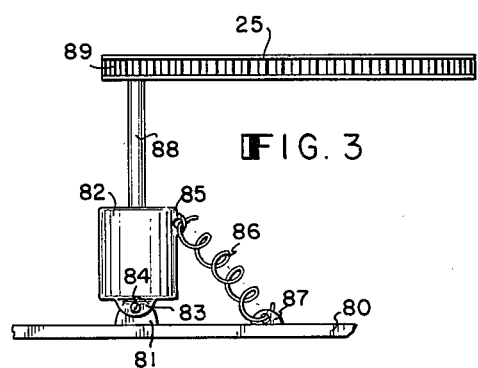
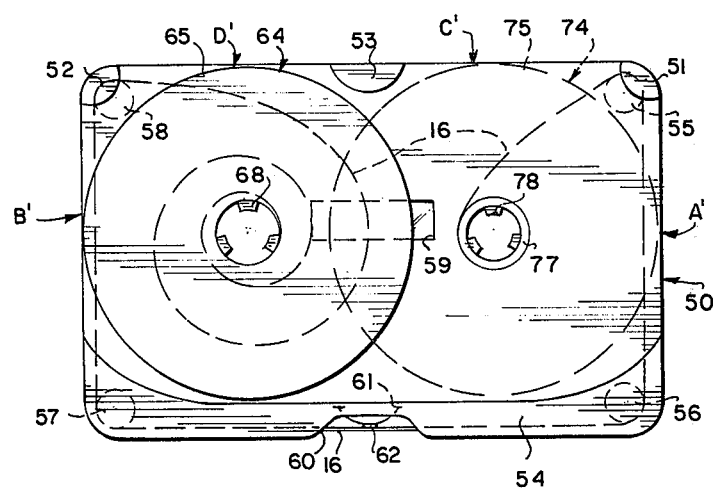

TAPE CASSETTE

BACKGROUND OF THE INVENTION

This invention is in the category of a tape cassette, generally used for translating magnetic tape during magnetic recording or reproducing recorded signals on the tape.

The cassette generally used is limited in its successive loading capability in that insertion in recording or reproducing equipment has to be done in a manner that clears the drive shafts used to drive the cassette reels at their centers. Hence, either a swiveled compartment has to be used to inject the cassette into the recording equipment, or the motor shafts have to be retracted, or the cassette must be manually inserted.

Another disadvantage of the prior art standard cassette is failure to obtain linear tape drive because the cassette reels are driven from their centers. Those cassette machines that have rollers in cooperation with the recording tape surface compensate for non-linearity somewhat, but the roller action on such recording surface, where there is an impelling roller on one surface of the tape and an idling roller on the other surface tend to stretch the tape, destroying any non-linear compensation attempted to be achieved.

SUMMARY OF THE INVENTION

Accordingly, it is an object of this invention to provide a cassette usable with conventional cassette recorders or players, but also usable with a new family of recording or reproducing equipment that will drive the tape linearly with time, will not have roller contact with the recording surface of the tape, and will not stretch the tape.

Hence, a cassette is provided with a central body portion and two covers snap-fit attached to the central body. Two disks with roughened edges are oppositely disposed on either face of the cassette and recessed below the highest surfaces of the cassette by providing tabs at the outer surface of the covers. These disks are used to translate the tape from one disk extension to another while driven at the outer periphery of the disk by coupling an external motor friction drive wheel to the disk.

The disks are arranged so as not to interfere with in-plane injection into recording or reproducing equipment so that a sequence of cassette units may be injected either along their narrow or wide dimensions one after another from a loading platform carrying the cassette units. Since the tape is passed over guide rollers in the cassette which are almost at the same radial distance as the edge of the drive disks, substantially linear translation of the tape obtains without stretching the tape or in any way making contact with recording surface thereof by means of roller transports.

BRIEF DESCRIPTION OF DRAWINGS

FIG. 3 is an elevation mechanical schematic showing a motive means driving one of the disks of the cassette.

FIG. 4 is a plan view mechanical layout showing the tape cassette wherein the drive disks are of sufficient diameter to make direct contact with drive wheels of external motive means, and also showing some redirection of the path of tape translation internal the cassette.

DETAILED DESCRIPTION

Figure 1:
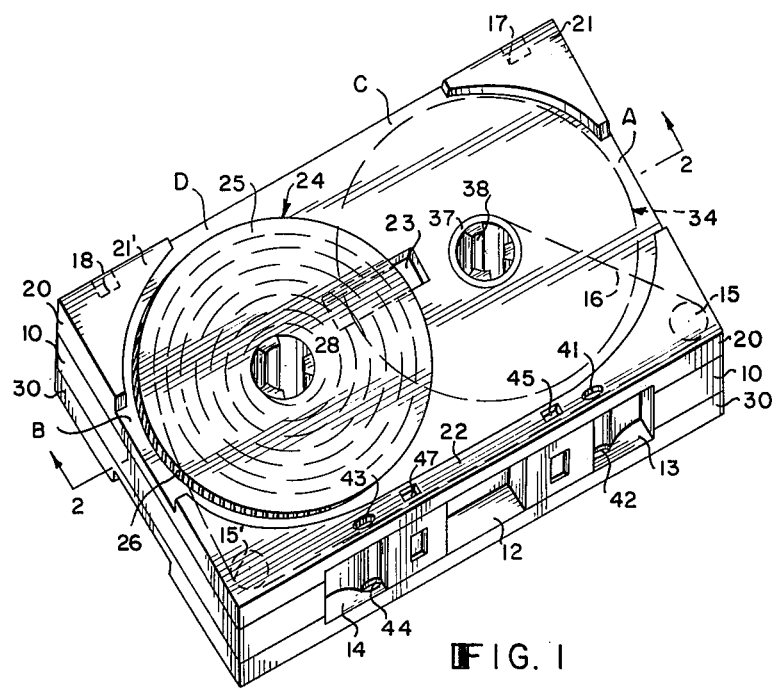
FIG. 1 is a perspective view of a tape cassette according to this invention.
Figure 2:
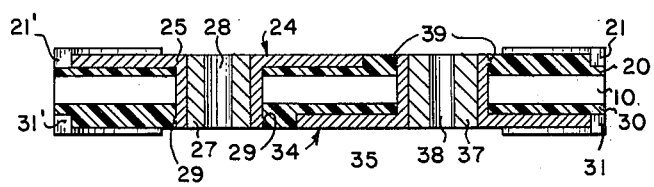
FIG. 2 is a cross-section view taken at plane 2—2 of FIG. 1 showing details exclusive of tape utilized in the cassette and also exclusive of fastener pins for holding the covers or faces of the cassette to the central body portion thereof.

Referring to FIGS. 1 and 2, a cassette is shown assembled except for minor parts such as tape-rest spring leaf and means for holding the several parts together. Such means for holding may be metal or plastic snaps provided as integral parts in the upper and lower covers that snap-fit into apertures located peripherally about the central body of the cassette.

Inasmuch as most parts are the same as in a standard magnetic tape cassette, only such parts will be referred to as necessary to explain the structure and functions of this invention.

A central body portion is provided at 10, generally molded from plastic material. Body 10 has an opening for accommodation of a magnetic head at 12 and depressions 13 and 14 for accommodating the parts usually prevalent in recorders using such cassette units, such as rollers or erase heads. Other apertures usually encountered in standard cassette units and having specific functions though shown in the drawings are not numbered or described.

The standard cassette as is in this instance, is provided with rollers 15 and 15' which are fixed by pins to one cover or face of the cassette, or to both covers thereof, and which are used to guide magnetic tape 16 internally of the cassette past the head. In this cassette rollers 15 and 15' may each be fixed by a pin extending into depressions on or in both upper and lower faces or covers. Knockout sections for preventing accidental erasure are provided in the central body portion as shown at 17 and 18.

Upper face or cover is provided at 20. Face 20 has as integral portions thereof raised tabs 21 and 21', and raised tab 22. An opening 23 is provided for viewing the quantity of tape used, and also a like opening in the lower cover or face, not shown. An aperture is provided in face 20 for insertion therein of an integral wheel assembly 24. Such drive wheel assembly is comprised of wheel member 25 with grooves, teeth or abrasive edge 26. As an integral portion of wheel assembly 24, a hollowed shaft 27 having teeth as at 28 internal the periphery thereof is provided for engaging a standard cassette motor drive shaft, if desired.

A raised annular portion 29 is provided at the end of and about the outer periphery of hollowed shaft 27, furthest from wheel member 25, for snap-fit engagement in a groove about the inner pheriphery of an aperture in the lower face or cover 30.

Lower face or cover as at 30 has integrally therewith raised tabs 31 and 31', and a raised tab similar to tab 22 but not visible from the drawings. An opening similar to opening 23 is provided in cover 30 used for the same purpose as opening 23 is used when the cassette is facing the viewer. An aperture is provided in face 30 for insertion therein of an integral wheel assembly 34. Such wheel assembly is comprised of wheel member or disk 35 with grooves, teeth or abrasive edge similar to edge 26. As an integral portion of wheel assembly 34, a hollowed shaft 37 having teeth as at 38 internally of the hollowed periphery thereof is provided for engaging a standard cassette motor drive shaft, if desired.

A raised annular portion 39 is provided at the end of and about the outer periphery of hollowed shaft 37 furthest from wheel member 35 for snap-fit engagement in a groove about the inner periphery of an aperture in the upper face or cover 20. The material of the faces or covers 20 and 30 preferably being teflon would provide minimal friction as wheels 25 or 35 were being driven by a roller, gear or wheel with abrasive edge at locations B or D at face 20 when wheel 25 is being driven, or at locations similar to locations A and C adjacent to face 30 locations when wheel 35 is being driven.

Covers 20 and 30 each have aperture pairs 41 and 42, and 43 and 44 respectively extending in the same direction as elongated portions 27 and 37, through the covers. Each pair of apertures 41–42 and 43–44 being positioned respectively within apertures 13 and 14.

Covers 20 and 30 each have aperture pairs comprising of aperture 45 in cover 20 and a like aperture in cover 30, and aperture 47 in cover 20 and a like aperture in cover 30. These aperture pairs are parallel to aperture pairs 41–42 and 43–44 and are positioned between aperture 12 and aperture pairs 41–42 and 43–44 respectively.

Covers 20 and 30 may be generally snap-fitted by protrusions, not shown, either on the covers into complementary apertures about the body periphery, or protrusions extending from the body periphery with complementary apertures situated peripherally about the covers.

Wheels 25 and 35 may be made slightly larger than illustrated, so that they extend to the side and rear edges of the cassette being even therewith or slightly overlap these edges or rear for engagement with a motor drive wheel without moving or tilting the drive motor. Otherwise, as shown, the motor or motors may be mounted in a pivot pin arrangement to effect about a three degree tilt of the motor drive means to engage with wheels 25 and/or 35, and may be spring loaded to urge the motor drive wheel against wheel 25 or 35. Such motor drive is described below in connection with FIG. 3.

This cassette may therefore be slipped into its play or use position without tilting, or without motor drive shaft interference. However, this cassette may also be used in recording equipment employing a standard cassette, inasmuch as the central drive with teeth 28 and 38 are the same as in those used in the standard cassette, permitting direct interchangeability. Such interchangeability is also possible in that the overall thickness at the thickest part of the standard cassette is not exceeded in the instant cassette.

When used with motive means to drive wheels 25 or 35, the apparent advantage gained is the constant rate of tape translated per unit time as the drive point is located at the translation point of tape over rollers 15 and 15', and is not driven from the center of the tape reel. A slot, not shown, is provided at the outer periphery of each of the elongated portions 27 and 37 for securing the ends of tape 16 to such portions 27 and 37.

Referring to FIG. 3, typical motive drive means for driving the cassette disks at points A and/or C, and B and/or D is provided as shown in connection with FIGS. 1 and 2. Though a tilting motive drive means is not required for the cassette as shown in FIG. 4, below, due to larger diameter cassette disks therein, still this motive drive means may be used to drive disks at A' and/or C', and B' and/or D' as shown in FIG. 4. The motive drive means is therefore mounted on base plate 80 which has lip 81. Motor 82 has a complementary lip 83 and a pivot pin as at 84 extending through lips 81 and 83 to provide pivoting ability to the motor. The motor also has a lip 85 to which is attached spring 86, the other side of spring 86 being attached to lip 87 of base plate 80. Motor shaft 88 has a complementary drive wheel 89 that engages or cooperates with the edge of disk 25, as shown in the cassette of FIGS. 1 and 2, at point B. This drive is exemplary of drive usable for this cassette and the cassette shown in FIG. 4 at the several points of drive illustrated.

Referring to FIG. 4, tape cassette 50 is similar to cassette of FIGS. 1 and 2, except for larger disks and certain modifications described hereinbelow.

Tabs 51, 52, 53 and 54 are provided at each of both faces of cassette 50 in similar locations. Additional rollers 55 and 58 are provided at the rear of the cassette internal thereto and oppositely positioned to their respective front rollers 56 and 57. The additional rollers enable greater assurance of maintaining tape 16 close to the outer periphery of the cassette disks to obtain substantially linear translation of the tape throughout its winding and unwinding process. Window 59 is provided in one face of the cassette with a like window at the oppositely parallel face. This cassette has a cut out as at 60 for admitting a record-reproduce head to make contact with the recording surface of tape 16. Tape 16 is backed by leaf spring 61 mounted in conventional manner in the cassette to provide the required pressure between the tape and the head. Spring 61 has a felt type member 62 affixed to it for the tape surface to cooperate therewith.

Wheel assembly 64 is similar to assembly 24 of FIGS. 1 and 2, assembly 64 having disk 65 and a generally hollow cylindrical extension similar in structure to extension 27, the instant cylindrical extension having teeth 68 therein to engage a motor drive shaft of a conventional cassette recorder. Wheel assembly 74 is comprised of disk 75 and a generally hollow cylindrical extension 77 similar in structure to that shown in FIG. 2 at 37. Extension 77 has internally extending teeth 78 to engage a motor drive shaft of a conventional cassette recorder. Disks 65 and 75 both extend to edges as at A', B', C' and D' or if preferred slightly beyond such edges for engaging drive wheels such as shown at 89 of FIG. 3. Disks 65 and 75 are recessed slightly below tabs such as at 51, 52, 53 and 54. If the cassette is injected into recording equipment along the lengthwise dimension, drives for forward or reverse are best provided at C' and D', whereas if injected along the shorter dimension, such drives are best provided at A' and B'. It should be noted that in both the cassette unit of FIG. 4 and the one shown in FIGS. 1 and 2, spring 61 with felt member 62 could be positioned so that the record head making contact at 62 does not have to move, or if it does have to move it need only be moved a very small distance, the head being installed so it is backed by a slight expansion spring, or a leaf spring similar to spring 61, so that upon sideways injection of the cassette into the recorder, along the longer dimension of the cassette, the head is pushed slightly back by the cassette casing proper, and is lodged in cooperation with tape 16 at 62 when the cassette is in injected position within the recording equipment. Similar provisions are applicable for head structural mounting when cassette is injected into the recording equipment along its shorter dimension, the leading injecting edge of the cassette being that edge that has cut out 60 therein.

What is claimed is:

1. A tape cassette, comprising in combination:
   a cassette case comprising a first cover and a second cover substantially parallel to the first cover and a hollow body interposed between and adapted to said covers, the first cover having a first aperture and a first orifice therethrough substantially in line with each other, the second cover having a second aperture and a second orifice therethrough substantially in line with each other; and
   a pair of first and second oppositely disposed disks external to said case and parallel to said covers, the first disk having a first elongated shaft integral therewith extending orthogonally therefrom and terminating in a first annular portion, said first annular portion extending through the first aperture and fitted for rotation in said second orifice, the second disk having a second elongated shaft integral therewith extending orthogonally therefrom and terminating in a second annular portion, said second annular portion extending through the second aperture and fitted for rotation in said first orifice.

2. The invention as stated in claim 1, wherein the first and second disks have roughened edges.

3. The invention as stated in claim 1, wherein each elongated shaft is generally hollow having an inner surface and teeth integral with said inner surface.

4. The invention as stated in claim 1, including tabs integral with said covers, said disks being recessed with respect to said tabs.

5. The invention as stated in claim 2, wherein said disks are capable of being driven at the roughened edges.

6. The invention as stated in claim 1, including: tape; and
   means, integral with each of the elongated shafts, for holding an end of said tape.

7. The invention as stated in claim 6, including at least one pair of rollers internal the cassette over which said tape is guided during its translation, said rollers being positioned substantially at the circumference of each of the disks.

8. The invention as stated in claim 6, wherein said body has a first opening extending through one of its walls through which a portion of said tape passes, said tape having a recording surface, said first opening exposing a part of said recording surface.

9. The invention as stated in claim 8, wherein said body has second and third openings therein in line with and spaced apart from and on each side respectively of the first opening.

10. The invention as stated in claim 9, wherein the first and second covers respectively have fourth and fifth pairs of openings located respectively within the second and third openings.

11. The invention as stated in claim 10, wherein the first and second covers respectively have sixth and seventh pairs of openings, positioned parallel to the fourth and fifth pairs and between the first opening and the fourth and fifth pairs, respectively.

12. The invention as stated in claim 1, including means adapted to said body for securing said covers thereto.

* * * * *